(12) United States Patent
Honda et al.

(10) Patent No.: US 7,423,772 B2
(45) Date of Patent: Sep. 9, 2008

(54) INFORMATION PROCESSING APPARATUS, JOB PROCESSING METHOD AND PROGRAM, AND COMPUTER-READABLE MEMORY MEDIUM

(75) Inventors: Hideki Honda, Kanagawa (JP); Takashi Imoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1079 days.

(21) Appl. No.: 10/647,273

(22) Filed: Aug. 26, 2003

(65) Prior Publication Data

US 2004/0105117 A1     Jun. 3, 2004

(30) Foreign Application Priority Data

Aug. 29, 2002 (JP) ............................. 2002-250434
Aug. 20, 2003 (JP) ............................. 2003-208093

(51) Int. Cl.
*G06F 3/12* (2006.01)
*G06F 15/00* (2006.01)

(52) U.S. Cl. .................................. 358/1.15; 358/1.13

(58) Field of Classification Search ................ 358/1.13, 358/1.14, 1.15, 1.16, 1.17, 1.18, 1.1, 1.6, 358/1.2, 1.9, 407, 468, 437, 1.11; 347/2, 347/3, 5; 399/1, 8, 19, 18, 20, 21; 710/32
See application file for complete search history.

(56) References Cited

U.S. PATENT DOCUMENTS 6,570,669 B1 * 5/2003 Onuma ...................... 358/1.15
2002/0021453 A1 * 2/2002 Sakamoto et al. ........... 358/1.14

FOREIGN PATENT DOCUMENTS

JP     2000-259368     9/2000
JP     2001-166892     6/2001

* cited by examiner

*Primary Examiner*—Dov Popovici
(74) *Attorney, Agent, or Firm*—Fitzpatrick, Cella, Harper & Scinto

(57) ABSTRACT

A mechanism for executing an optimum cancelling method from among a plurality of cancelling methods for many various print environments in a user's environment. The mechanism obtains limitation information of the cancellation and determines a the optimum cancelling method among the plurality of cancelling methods. The mechanism then executes the determined optimum cancelling method.

10 Claims, 9 Drawing Sheets

FIG. 10

MEMORY MEDIUM SUCH
AS FD/CD-ROM, ETC.

| DIRECTORY INFORMATION |
|---|
| 1ST DATA PROCESSING PROGRAM<br>PROGRAM CODE GROUP CORRESPONDING TO STEPS IN FLOWCHART SHOWN IN FIG. 4 |
| 2ND DATA PROCESSING PROGRAM<br>PROGRAM CODE GROUP CORRESPONDING TO STEPS IN FLOWCHART SHOWN IN FIG. 5 |
| 3RD DATA PROCESSING PROGRAM<br>PROGRAM CODE GROUP CORRESPONDING TO STEPS IN FLOWCHART SHOWN IN FIG. 6 |
| |

MEMORY MAP OF MEMORY MEDIUM

INFORMATION PROCESSING APPARATUS, JOB PROCESSING METHOD AND PROGRAM, AND COMPUTER-READABLE MEMORY MEDIUM

BACKGROUND OF THE INVENTION

1. Field of the Invention

The invention relates to an information processing apparatus having transmitting means for transferring data of a job formed on the basis of application data to a printer via interface means, job processing method and program, and a computer-readable memory medium.

2. Related Background Art

Hitherto, generally, a dedicated reset signal line is prepared for an interface (parallel I/F, USB, etc.) for connecting a printer and a computer and a job which is being printed can be cancelled by issuing a reset signal.

After the reset signal is issued, a setting of the printer is returned to an initial value and a next print job can be normally started.

However, in such an environment designed on the assumption that the printer is shared by a network, there is an environment such that the reset signal cannot be issued. This is because it is intended to avoid a risk of stopping printing of a third party possible when a resetting process is indiscriminately executed.

In such an environment, as disclosed in Japanese Patent Application Laid-Open No. 2001-166892, there has been proposed a method whereby in place of transmitting the reset signal upon cancellation of the print job, whether a data block of the print job has been completed or not is discriminated and if it is not completed, complementary data is formed, the data block is completed, and a process for cancelling the print job is executed.

The complementary data will now be described. The complementary data corresponds to data for shifting the printer to a state where the data transfer of the print job subsequent to the cancellation of predetermined print data can be normally restarted. For example, there is a problem such that when the transfer of the print data to the printer is stopped halfway, if the complementary data is not supplied to the printer, the printer enters a waiting state for reception of a continuation of an incomplete command, the head of the next print data is erroneously regarded as subsequent data, and unnecessary dust printing is executed. There is another problem such that even if the command has been completed, since a form feed code is not received, the next printing is started from a halfway position of paper without delivering the paper.

Therefore, the complementary data prevents such inconvenience. The complementary data is constructed by: data to complete the incomplete command in the print data which remains in the printer and whose stop has been instructed; a command (to reset the setting upon printing) to allow the printer to deliver a page by a paper delivery command of FF (paper delivery) and, further, finish the print job; and the like.

However, there is also a printer in which, in the case of sending the reset signal and cancelling the printing, the interface is set to a busy status and the initializing operation is certainly executed.

In this case, there is a problem such that the next print job cannot be printed until the initializing operation is finished.

If two kinds of print system environments of a case where the reset signal can be issued and a case where the reset signal cannot be issued exist, there is also a problem such that it is impossible to execute a desired cancelling process according to the environment. In a printing environment in which a plurality of cancelling methods exist, it is necessary to individually form a print control system corresponding to each of the cancelling methods, so that large development costs are necessary.

As a case where the problems as mentioned above are particularly presumed, a version environment of an operating system can be mentioned. For example, in the operating systems of various versions which are provided as operation environments of the user such as Windows 2000 (registered trademark), Windows XP, and the like, there are an OS which supports the reset signal and an OS which does not support the reset signal every version of those OSs. Therefore, in the operating system of a certain version, it is necessary to prepare a software module (which, for example, corresponds to a data transmission control program in the embodiment), which uses the reset signal. In the print system that operates by the operating system, which does not support the reset signal, there is a problem such that it is necessary to prepare a software module designed so as to use the complementary data and large development costs and a long time are necessary.

Further, although a supporting form such that a printer device of a predetermined apparatus type corresponds to the operating system of the latest version is generally used, there is a problem such that even if the operating system of a new version corresponds to the reset signal, since the printer device which was sold when the correspondence to the reset signal was not made has inherently not been designed to correspond to the reset signal, even if the reset signal is supported by the operating system by which the print system operates, an error occurs if the reset signal is used in the printer device.

Also with respect to the interfaces, various types of standards exist and whether the reset signal is supported or not is different every type of interface. There is a problem such that even in the case of the type of interface which supports the reset signal, there is also a case where the reset signal cannot be used in dependence on the version of the operating system, and hitherto, it is necessary to prepare a software module to instruct the resetting every combination of the operating system and the type of interface, so that large development costs and a long time are necessary.

Since various cases are presumed as environments in which the print system operates as mentioned above, in such a situation, it is demanded to realize a software module (which, for example, corresponds to the data transmission control program in the embodiment) which can be used irrespective of the difference of the environments and can make a general reset instruction.

Particularly, it is demanded to realize a software module (which, for example, corresponds to the data transmission control program in the embodiment) which can make a general reset instruction and can be used irrespective of the version of the operating system, the specification of the printer device on its sale, and an arbitrary combination of the types of interfaces as mentioned above.

Further, in the case of the method of executing the cancelling process by sending the complementary data as disclosed in Japanese Patent Application Laid-Open No. 2001-166892, there is a problem such that if the interface enters a busy status due to a no-paper error or the like on the printer side, predetermined complementary data cannot be sent from the information processing apparatus side and the cancelling process cannot be executed.

SUMMARY OF THE INVENTION

The invention is made in consideration of the above problems and, in a print system in which various cancelling methods exist mixedly, it is an object of the invention to provide an information processing apparatus, job processing method and program, and a computer-readable memory medium, in which a cancelling process can be executed by using a proper one of the plurality of cancelling methods in accordance with limitation of various environments in which the print system operates. In an information processing apparatus for transferring data of a job formed on the basis of application data to a printer via interface means, there is provided a mechanism such that a communication environment regarding the data transfer is discriminated, and when cancellation is instructed during the data transfer, the data transfer via the interface means is cancelled by one of a plurality of cancelling methods on the basis of the communication environment determined by discriminating means.

Or, in an information processing apparatus which can communicate with a printer, there is provided a mechanism such that a job including print data based on application data is formed, data of the formed job is transmitted to the printer, further, limitation information of cancellation of the job is obtained, and a cancelling process of the transmitted job is executed by a cancelling method based on the obtained limitation information.

BRIEF DESCRIPTION OF THE DRAWINGS

FIG. 10 is a diagram for explaining a memory map in a memory medium to store various data processing programs that can be read out by the information processing apparatus according to the invention.

DESCRIPTION OF THE PREFERRED EMBODIMENTS

First Embodiment

Figure 1:
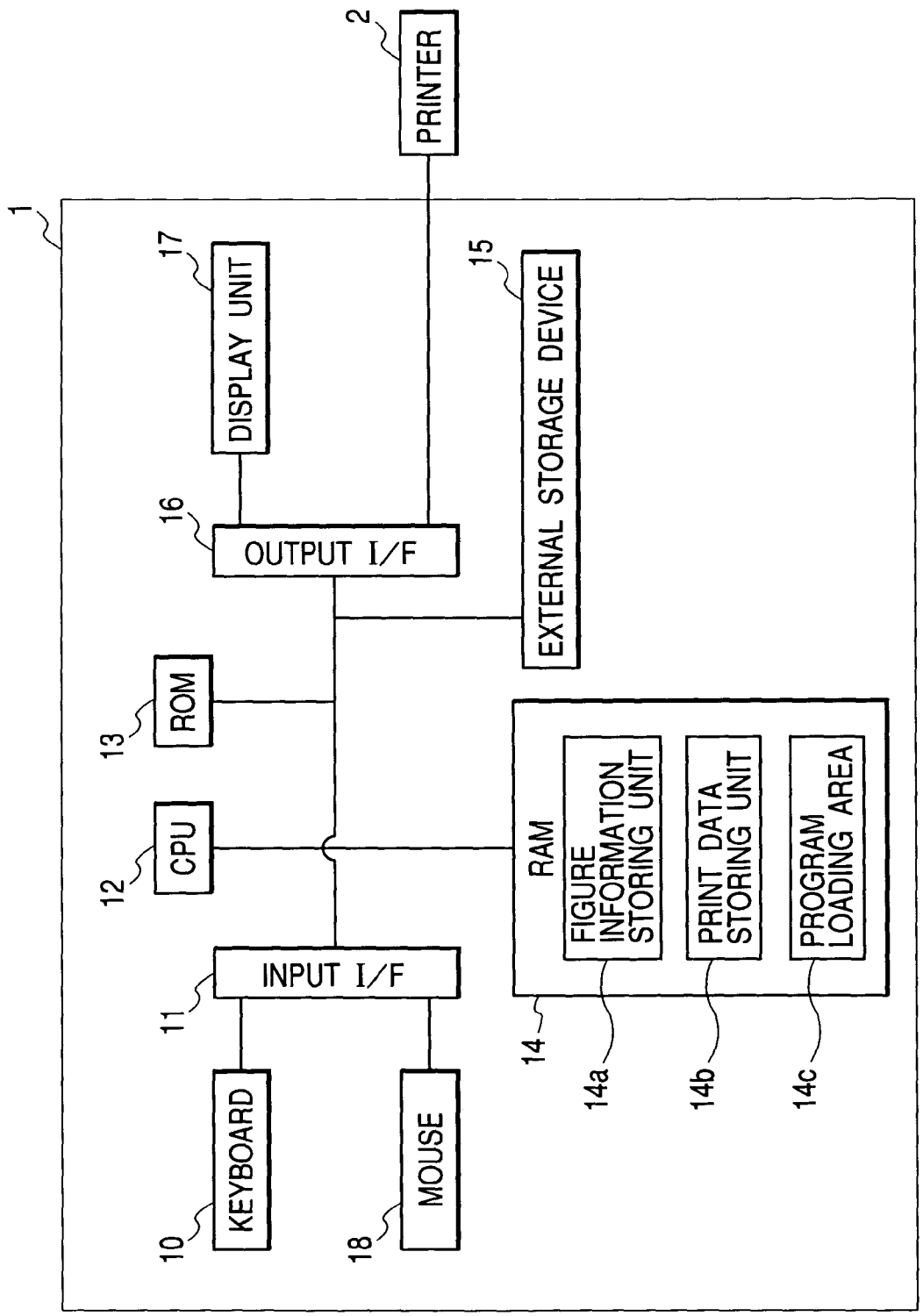
FIG. 1 is a block diagram for explaining a construction of an image processing system showing the first embodiment of the invention.

FIG. 1 is a block diagram for explaining a construction of an image processing system to which an information processing apparatus showing the first embodiment of the invention can be applied. Naturally, the invention can be applied to any of a single apparatus, a system comprising a plurality of apparatuses, and a system which is connected via a network such as LAN (Local Area Network), WAN (Wide Area Network), or the like and executes processes so long as the functions of the invention are executed.

A print control system according to the first embodiment is constructed by a computer 1 and a printer 2. As an external interface, a Centronics parallel interface, a USB interface, an IEEE1394 interface, or the like is considered.

The computer 1 has: an input interface 11; a CPU 12; a ROM 13; a RAM 14; an external storage device 15; an output interface 16; a display unit 17; and a mouse 18. An initial setting program has been stored in the ROM 13.

Figure 2:
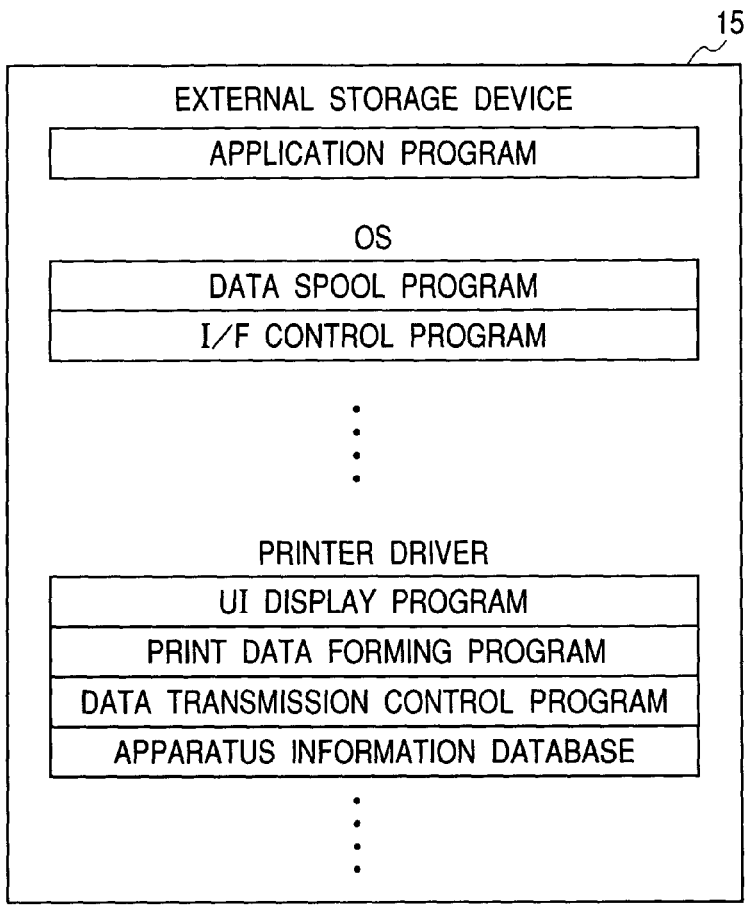
FIG. 2 is a diagram for explaining an external storage device shown in FIG. 1.

As shown in FIG. 2, an application program, an OS (a data spooling program, a data transmission processing program, an interface control program, etc.), and a printer driver (a UI display program, a print data forming program, a data transmission control program, an apparatus information database, etc.) have been stored in the external storage device 15.

The application program is a program for providing a drawing environment and a print environment (the print environment used here denotes a print environment such that which printer is selected via a print dialog of the application, or the like) and instructing the start of printing. The data spooling program is a program for receiving the formed print data, dividing it into print data blocks of an arbitrary size, and repetitively issuing a data transfer request.

The interface control program is a program for writing and reading out data via the Centronics parallel interface, USB interface, IEEE1394 interface, or the like.

The UI display program is a program for displaying a UI for setting a printer driver. The print data forming program is a program for converting figure information drawn in accordance with the application program into a printer command.

The data transmission control program is a program for receiving a data transfer request, transferring the inputted print data blocks, and obtaining status information from the printer and differs from the data transmission processing program described in FIG. 2. The apparatus information database is a database for storing printer peculiar information.

The RAM 14 has a figure information storing unit 14a, a print data storing unit 14b, and a program loading area 14c. Each program stored in the external storage device 15 is stored in the RAM 14. The CPU 12 controls each unit in accordance with the control program stored in the RAM 14.

Figure 3:
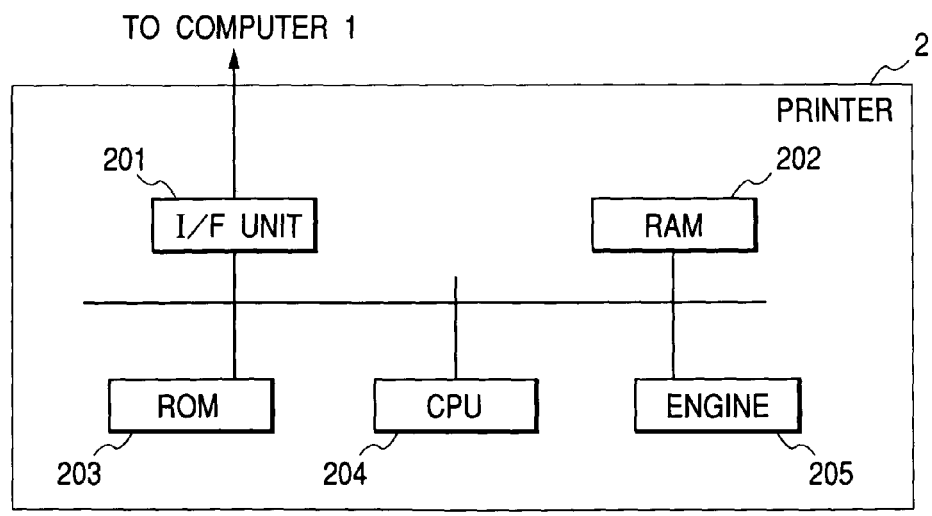
FIG. 3 is a block diagram for explaining a construction of a printer shown in FIG. 1.

FIG. 3 is a block diagram showing a construction of the printer 2 shown in FIG. 1.

In FIG. 3, the printer 2 has an interface unit 201, a RAM 202, a ROM 203, a CPU 204, and an engine 205.

The interface unit 201 is connected to the output interface 16 of the computer 1. The interface unit 201 can be applied to either wireless communication or wire communication. The interface unit 201 can be applied to a form in which a host such as a Centronics interface or the like and the printer are connected in a one-to-one correspondence relational manner or a form in which the host and the printer are connected by the LAN via an Ethernet cable.

The control program and the like have been stored in the ROM 203. The CPU 204 controls each unit of the printer 2 in accordance with the control program stored in the ROM 203.

The RAM 202 is used as a main memory and a work memory of the CPU 204 and has an input buffer for temporarily storing the received data. The engine 205 executes the printing on the basis of the data stored in the RAM 202.

The data transmission control program in FIG. 2 is constructed in a manner such that by obtaining ID information or the like stored in the apparatus information database in FIG. 2, the cancelling method which is supported by the apparatus type can be discriminated.

Figure 4:
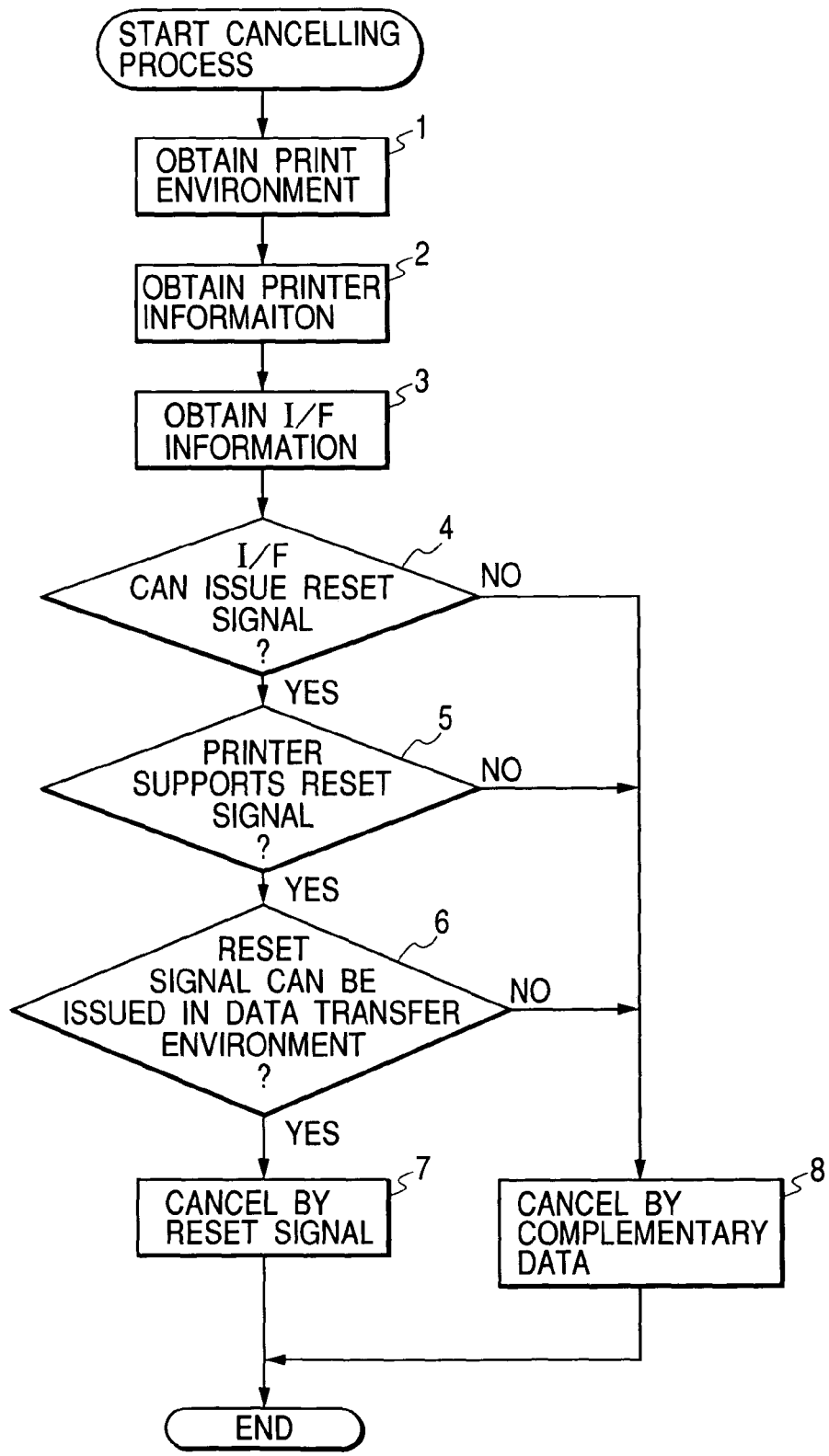
FIG. 4 is a flowchart showing an example of a first print cancelling processing procedure in an information processing apparatus according to the invention.

The printer control system according to the first embodiment further has a construction such that, in addition to the print system comprising the printer 2 and the computer 1 shown in FIGS. 1 and 3, the print data from the application is once spooled by intermediate code data as shown in FIG. 4.

An example of the cancelling process of the first print job in the information processing apparatus according to the invention will be described hereinbelow with reference to a flowchart shown in FIG. 4. When the cancelling process in the invention is executed by the host computer, the following operations are consequently executed in the printer: a recording operation of an engine of the printer is stopped; the job data in the input buffer of the printer is abandoned; set values such as resolution, paper feeding method, print mode, and the like which have been set into the printer upon execution of the job are cleared; an operating mode of the printer is initialized; and the media which is being printed is delivered. In the host computer, the transfer of the spooled print data (job data) to the printer is stopped.

FIG. 4 is a flowchart showing an example of a first print cancelling processing procedure of the print job in the information processing apparatus according to the invention. FIG. 4 corresponds to the procedure which is executed by the data transmission control program (including the functions and processes of the print environment discriminating unit, the interface discriminating unit, and the cancelling method switching unit in the embodiment) of the printer driver which is stored in the RAM 14 shown in FIG. 1. Reference numerals (1) to (8) in FIG. 4 indicate processing steps, respectively.

When cancellation is requested during the data transfer, first, a print environment of the selected printer which can be set by the data transmission control program in FIG. 2 is obtained (1). In other words, the process in step (1) corresponds to a process such that when the data transmission control program issues various settings such as a reset signal (command) and the like to the current selected printer, the data transmission control program obtains the information of an operating system which is presently operating. The data transmission control program obtains the printer information showing whether each printer stored and managed in apparatus information database in FIG. 2 supports the cancellation by the reset signal or not (2). When the cancellation by the reset signal is not supported, it means that although the reset signal is supported on the specifications of the interface and the specifications of the operating system, there is a case where the cancellation by a cancelling signal is not supported for convenience on the specifications of the printer. With respect to the printer of such an apparatus type, information showing that the reset signal is not supported has been stored in the apparatus information database in a form such that it can be referred to. For example, in the case where the legacy printer which was operating by the operating system which was sold before and does not support the reset signal is enabled to operate by the new operating system (print environment) which supports the reset signal, since the printer has inherently been manufactured by presuming the operating system which does not support the reset signal, information showing that the reset signal is not supported is managed in the printer information. Although an explanation will be made hereinbelow by presuming a reset form such as signal which is transmitted via a physical dedicated line in the Centronics interface, software reset command which is instructed via a control channel of the USB, or the like as a reset signal, naturally, the invention is not limited to such a reset form.

Naturally, the invention can be applied to an information processing apparatus which can determine the optimum cancelling method from various cancelling methods on the basis of the limitation information of the cancellation. The data transmission control program obtains the type of interface which is presently used for data transfer (3). For example, in step (3), a printer output port name is obtained by using an API of the operating system and which type of interface is used can be discriminated from the obtained printer output port name. For example, in the case of an IrDA (InfraRed Data Association) interface or the like, the resetting by the reset signal is not supported. A method of obtaining the type of interface is not limited to that described above. Each of the print environment (OS version) which is obtained in steps (1) to (3), the printer information which is obtained from the apparatus information database, and the information of the type of interface or a combination of some of them is also called limitation information as information which is used to specify the proper cancelling method (resetting method). It is true of the second and third embodiments.

In step (4), the data transmission control program which functions as an interface discriminating unit discriminates whether the type of interface which is presently used for data transfer indicates the interface which can issue the reset signal or not. If it is determined that the type of interface does not indicate the interface which can issue the reset signal, the cancelling method based on complementary data is selected in step (8) and the processing routine is finished.

In step (4), if it is determined that the type of interface indicates the interface which can issue the reset signal, whether the printer 2 supports the reset signal or not is further discriminated from the obtained printer information in step (5). If it is determined that the printer 2 does not support the reset signal, step (8) follows and the cancelling process based on the complementary data is selected and the processing routine is finished.

Specific examples in the case where the answer is NO in step (5) will be mentioned here. For example, in the printer using the Centronics interface, the discrimination result of step (4) indicates YES. However, it seems as if inconvenience of the printer occurred in the case where the printer receives the resetting by the reset signal via the Centronics I/F. With respect to the type of printer as mentioned above, the information showing that the resetting by the reset signal is not supported has previously been stored in the apparatus information database in a form in which it can be referred to.

If it is determined in step (5) that the printer 2 supports the reset signal, in step (6), the data transmission control program which functions as a cancelling method switching unit discriminates whether the cancelling method switching unit can select the data transfer environment or not from the print environment information obtained in step (1). If it is determined in step (6) that the cancelling method based on the issuance of the reset signal can be selected, in step (7), the data transmission control program as a cancelling method switching unit selects the cancelling method based on the issuance of the reset signal, activates the reset signal, cancels the printing process which is being executed by the printer 2, and finishes the processing routine.

If the data transmission control program determined in step (6) that the cancelling method based on the issuance of the reset signal cannot be selected, step (8) follows. The cancelling process based on the complementary data is executed and the processing routine is finished. In step (6), specifically speaking, whether the print environment (version of the OS) obtained in step (1) can issue the reset signal or not is discriminated with respect to the interface determined to be YES in the discrimination result in step (4). For example, even if the discrimination results in steps (4) and (5) is YES, when the print environment is Windows NT4 (registered trademark of Microsoft Corporation), the Centronics interface determined that the discrimination result in step (6) is NO.

When the print environment (version of the OS) is the latest print environment (version of the OS) released after the printer was sold or a print environment (type of the OS) other than the above environments, it is determined that the discrimination result in step (6) is NO. The processing routine advances to step (8).

Executing order of the processes in steps (4), (5), and (6) described above is not limited to the above order. For example, a form as shown in a flowchart of FIG. 6, which will be explained hereinlater, is also presumed in FIG. 4. Discriminating order can be set to arbitrary order so long as the discriminating processes in steps (4), (5), and (6) are executed. It is true of the second and third embodiments.

As mentioned above, the computer 1 obtains the type of interface which is presently used for data transfer, the print environment, and the printer information and discriminates whether the cancelling method based on the issuance of the reset signal is possible or not every information. If the cancellation based on the issuance of the reset signal is impossible, the cancelling method switching unit selects the cancelling method for transferring the complementary data. The cancelling process based on the transfer of the complementary data is executed in a data transfer cancellation processing unit. If the cancellation based on the issuance of the reset signal is possible, the cancelling method based on the issuance of the reset signal is selected. The cancelling process based on the issuance of the reset signal is executed in the data transfer cancellation processing unit.

Thus, data transfer cancelling method can be freely switched in accordance with the print environment between the information processing apparatus and the printer and the construction of the printer and the interface without causing a defective printing.

According to the cancellation (resetting of the printer) of the job by the complementary data, the printer has to be able to write information from the outside. For example, in a status of generation of no-paper error, the printer enters a busy status and enters a status where the data from the outside cannot be written, and the cancellation (resetting of the printer) by the complementary data cannot be instructed. For example, in the case where data of three pages has already been stored in a print buffer of the printer, if the complementary data is written into the printer from the outside, the cancellation (resetting of the printer) of the job by the complementary data is executed after completion of a print outputting process of three pages. There is, consequently, a problem such that a response speed to the cancelling instruction is slow. According to the flowchart of FIG. 4, since the resetting by the reset signal is used as much as possible, inconvenience which is caused when the complementary data is used can be prevented. That is, in the resetting by the reset signal, the certain resetting of a high response speed can be executed.

Since the data transmission control program uses the optimum cancelling method (resetting method) in consideration of each limitation information of the print environment (OS version), the type of interface, and the printer information, a general mechanism of the cancellation of the job which can properly cope with many various print environments on the user side can be realized.

Even if an OS of a new version or an interface of a new type is sold and new items are added to the limitation information, it is possible to cope with it by updating the apparatus information database for making the discrimination based on the limitation information or the print environment discriminating unit and the interface discriminating unit included in the data transmission control program. Therefore, the development costs and time can be fairly reduced.

Second Embodiment

An example of the second print cancelling process of a print job in the information processing apparatus according to the invention will be described with reference to a flowchart shown in FIG. 5.

Figure 5:
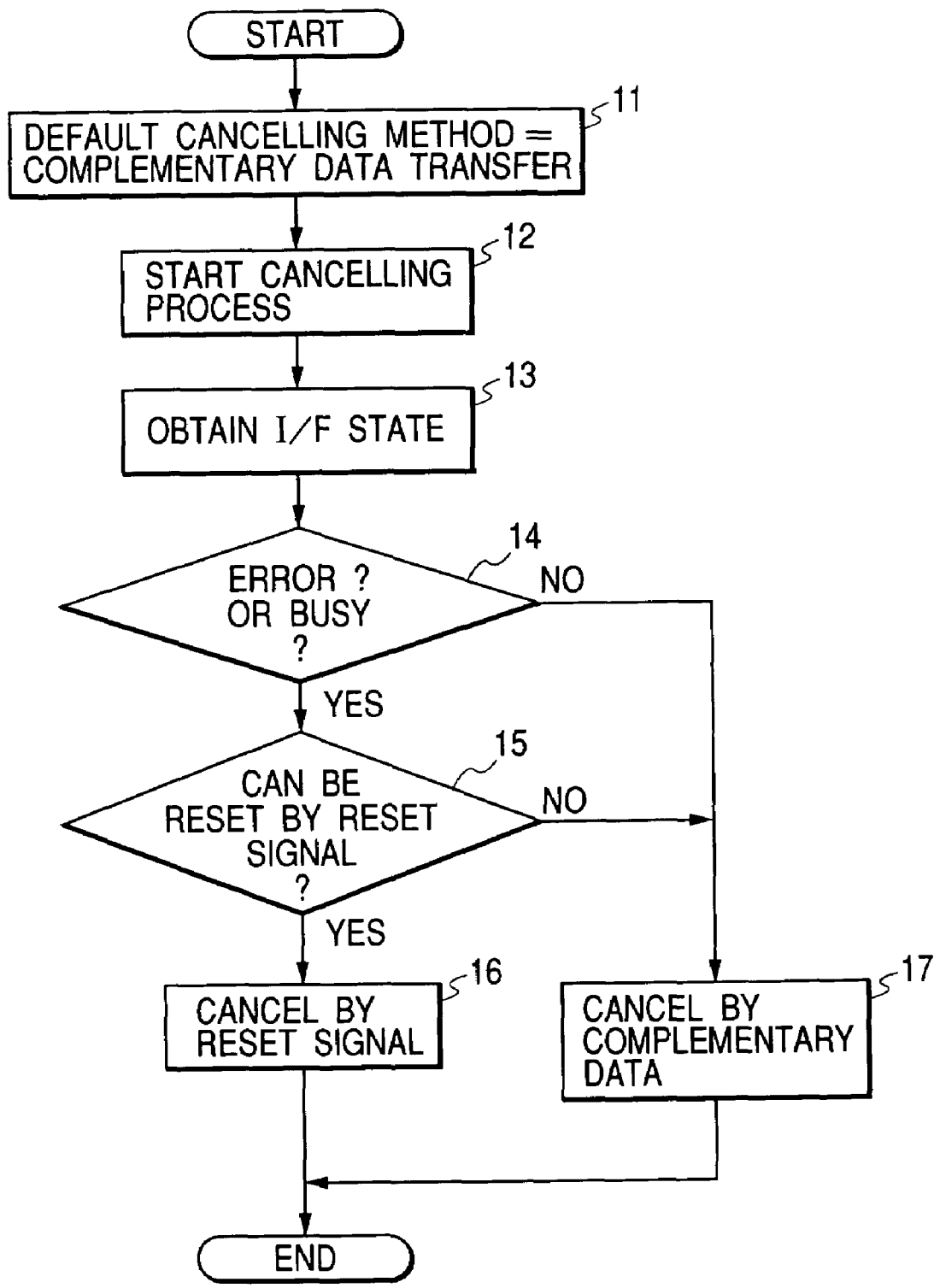
FIG. 5 is a flowchart showing an example of a second print cancelling processing procedure in the information processing apparatus according to the invention.

FIG. 5 is the flowchart showing an example of a cancellation processing procedure of the second print job in the information processing apparatus according to the invention. FIG. 5 corresponds to the procedure which is executed by the data transmission control program (including the functions and processes of the print environment discriminating unit, the interface discriminating unit, and the cancelling method switching unit in the embodiment) stored in the RAM 14 shown in FIG. 1. Reference numerals (11) to (17) denote processing steps, respectively.

First, in step (11), a complementary data transfer for transferring the complementary data is set as a default of the cancelling method for the printing process.

If the cancelling request is made during the data transfer in step (12), the data transmission control program which functions as an interface discriminating unit obtains the current state of the interface in step (13).

The data transmission control program discriminates whether the current communicating state of the interface is the error status or the busy status in step (14). If it is determined that the communicating state of the interface is the error status or the busy status, since the complementary data cannot be transferred to the printer 2, the data transmission control program which functions as a cancelling method switching unit discriminates in step (15) whether the cancelling method based on the issuance of the reset signal can be selected from, for example, the print environment information, printer information, and interface information which have previously been obtained in steps (1) to (3) shown in FIG. 4 or not. If it is determined that it can be selected, the data transmission control program selects the cancelling method based on the issuance of the reset signal (16). The processing routine is finished.

If it is decided in step (14) that the error or the like does not occur or if it is determined that the resetting by the reset signal is impossible, step (17) follows. The cancelling method based on the complementary data is selected and the processing routine is finished.

As mentioned above, the cancelling method can be switched in accordance with the state of the interface.

Thus, the computer 1 in the status where the complementary data cannot be sent to the printer 2 and the cancelling process cannot be executed can execute the cancelling process by switching the cancelling method to the cancelling method based on the reset signal.

The different cancelling methods are freely switched and controlled so as to be adapted to the data communication environment of the computer 1 and the printer 2 which can communicate with each other via the interface. When the cancelling method based on the transfer of the complementary data is set as a default, for example, if an error such as no paper or the like does not occur in the printer, the cancelling process is executed by the transfer of the default complementary data. In the case of an error such as no paper or the like in the printer, if the printer on the data transfer destination side corresponds to the cancelling process based on the reset signal, the process is immediately switched to the cancelling process based on the reset signal, thereby enabling the cancelling process to be executed. In this manner, it is possible to flexibly cope with the foregoing various cases. Consequently, the apparatus can be shifted to the state where the subsequent print job can be normally restarted.

If the cancellation by the complementary data can be instructed, it is instructed so as to execute the cancellation by the complementary data. Therefore, a problem such that a cleaning process accompanied with the suction of a head of an ink jet printer is executed by the resetting by the reset signal and the ink is wastefully consumed can be avoided. The useful cancelling method can be realized in accordance with an application field of the user.

Third Embodiment

The case where when the cancelling process based on the complementary data transfer is supported, the cancelling process can be executed by the reset signal has been described in the first and second embodiments. However, in accordance with a mechanism of the printer, for example, even in the case of executing a predetermined initializing operation (for example, cleaning process mentioned in the second embodiment) like an ink jet printer, by limiting the timing for issuing the reset signal in accordance with the executing state of the initializing operation, the number of times of issuance of the reset signal is minimized and the cancelling process can be switching-controlled so that the apparatus can be promptly shifted to the state where the next print job can be processed. Such an embodiment will be described hereinbelow.

An example of the third cancelling process of the print job in the information processing apparatus according to the invention will be described hereinbelow with reference to a flowchart shown in FIG. 6.

Figure 6:
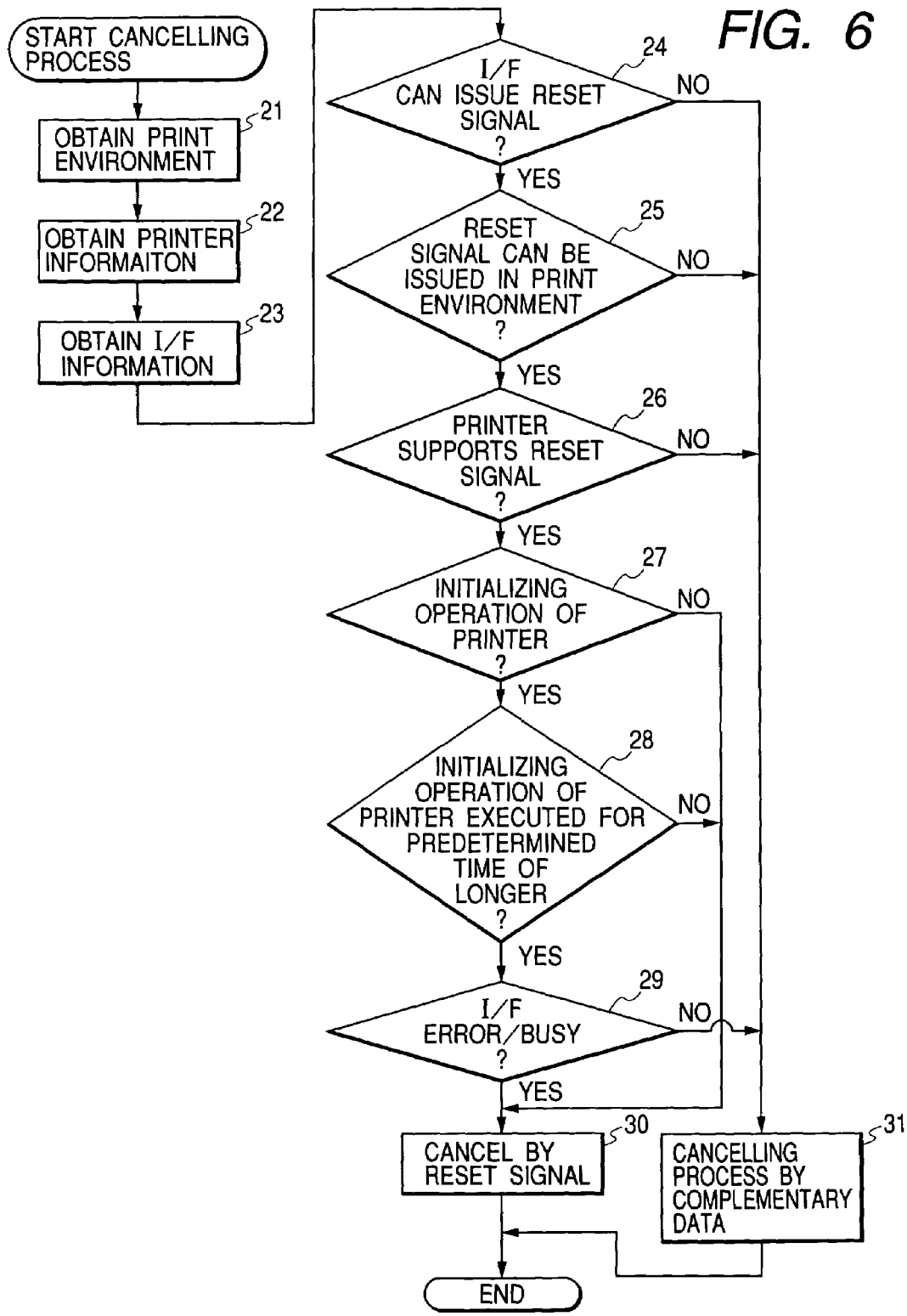
FIG. 6 is a flowchart showing an example of a third print cancelling processing procedure in the information processing apparatus according to the invention.

FIG. 6 is the flowchart showing an example of the third print cancelling processing procedure of a print job in the information processing apparatus according to the invention. FIG. 6 corresponds to the procedure which is executed by the data transmission control program (including the functions and processes of the print environment discriminating unit, the interface discriminating unit, and the cancelling method switching unit in the embodiment) which is stored in the RAM 14 shown in FIG. 1. Reference numerals (21) to (31) in FIG. 6 indicate processing steps, respectively.

First, when the cancellation is requested during the data transfer, a print environment of the selected printer which can be set by the data transmission control program is obtained (21).

The data transmission control program obtains the printer information showing whether each of the printers which have been stored and managed in the apparatus information database in FIG. 2 supports the cancellation by the reset signal or not (22).

The data transmission control program obtains the type of interface which is presently used for data transfer (23).

In step (24), the data transmission control program functioning as an interface discriminating unit discriminates whether the type of interface which is presently used for data transfer indicates the interface which can issue the reset signal or not. If it is determined that the type of interface does not indicate the interface which can issue the reset signal, step (31) follows. The cancelling process based on the complementary data is selected and the processing routine is finished.

If it is determined in step (24) that the type of interface which is presently used for data transfer indicates the interface which can issue the reset signal, in step (25), the data transmission control program discriminates whether the reset signal can be issued or not on the basis of the print environment information obtained in step (21). If it is determined that the reset signal cannot be issued, step (31) follows. The cancelling process based on the complementary data is selected and the processing routine is finished.

If it is determined in step (25) that the reset signal can be issued, whether the printer 2 which is communicating supports the reset signal or not is discriminated in step (26) from the printer information obtained in step (22). If it is determined that the reset signal is not supported, step (31) follows. The cancelling process based on the complementary data is selected and the processing routine is finished.

If it is determined in step (26) that the reset signal is supported, the data transmission control program discriminates whether the printer 2 executes the initializing operation (a predetermined pre-print-start process for printing by making a carriage and the like operative) or not in step (27). If it is determined that the initializing operation is not executed, step (30) follows. The cancelling process based on the reset signal is selected and the processing routine is finished. Whether the current target printer executes the initializing operation or not can be specified by referring to the apparatus information database described in the first embodiment.

If it is determined in step (27) that the initializing operation is executed, step (28) follows and the data transmission control program discriminates whether the initializing operation is executed for a predetermined time or longer or not. If it is determined that the initializing operation is not executed for the predetermined time or longer, step (30) follows. The cancelling process based on the reset signal is selected and the processing routine is finished. Whether the initializing operation needs the predetermined time or longer or not can be also specified by referring to the apparatus information database in a manner similar to step (27).

If it is determined in step (28) that the initializing operation is executed for the predetermined time or longer, the data transmission control program discriminates whether the current communicating state of the interface is in the error status or the busy status in step (29). If it is determined that the communicating state of the interface is in the error status or the busy status, step (30) follows. The cancelling process based on the reset signal is selected and the processing routine is finished.

If it is determined in step (29) that the communicating state of the interface is not in the error status or the busy status, step (31) follows. The cancelling process based on the complementary data is selected and the processing routine is finished.

As described above, owing to the processes in steps (21) to (26), when the cancellation is requested during the data transfer, if the current print environment is in a state where the reset signal can be issued, the print environment discriminating unit can recognize it. When the printer 2 supports the cancellation by the reset signal, the print environment discriminating unit can recognize it from the apparatus information database.

Owing to the process in step (27), if the cancellation by the reset signal is supported, whether the initializing operation is executed or not can be recognized. In the case of executing the initializing operation in step (28), an executing time can be also recognized.

Further, the interface discriminating unit can know the type of interface which is presently used for data transfer in step (23).

As mentioned above, the cancelling method switching unit obtains the type of interface which is presently used for data transfer (step (23)). When discriminating whether the cancelling method based on the issuance of the reset signal is possible or not, if the cancellation based on the issuance of the reset signal is impossible (NO in step (24)), the cancelling method switching unit selects the cancelling method of transferring the complementary data and the cancelling process based on the complementary data transfer is executed in the data transfer cancellation processing unit (step (31)).

If the cancellation based on the issuance of the reset signal is possible (YES in step (24)), whether the cancelling method based on the issuance of the reset signal is possible or not is discriminated (step (25)) on the basis of the information showing whether the reset signal can be issued in the current obtained print environment or not. If the cancellation based on the issuance of the reset signal is impossible (NO in step (25)) as a discrimination result, the cancelling method switching unit selects the cancelling method of transferring the complementary data and the cancelling process based on the complementary data transfer is executed in the data transfer cancellation processing unit (step (31)).

If the cancellation based on the issuance of the reset signal is possible as a discrimination result, whether the printer supports the cancellation by the reset signal or not is further discriminated on the basis of the obtained information (step (26)). If the printer does not support the cancellation by the reset signal, the cancelling method switching unit selects the cancelling method of transferring the complementary data and the cancelling process based on the complementary data transfer is executed in the data transfer cancellation processing unit (step (31)).

Whether the printer supports the cancellation by the reset signal or not is discriminated on the basis of the obtained information and if the initializing operation is not executed (NO in step (27)), the cancelling method switching unit selects the cancelling method based on the issuance of the reset signal and the cancelling process based on the issuance of the reset signal is executed in the data transfer cancellation processing unit. In the case of executing the initializing operation, the executing time of the initializing operation is obtained. If the executing time of the initializing operation is shorter than a predetermined time (NO in step (28)), the cancelling method switching unit selects the cancelling method based on the issuance of the reset signal and the cancelling process based on the issuance of the reset signal is executed in the data transfer cancellation processing unit (step (30)).

If it is determined that the executing time of the initializing operation is longer than the predetermined time, when the obtained current state of the interface (whether the error has occurred or the interface is busy or not, or the like) is the error status or the busy status (YES in step (29)), the cancelling method switching unit selects the cancelling method based on the issuance of the reset signal and the cancelling process based on the issuance of the reset signal is executed in the data transfer cancellation processing unit (step (30)).

If no error occurs and the interface is not busy, the cancelling method switching unit selects the cancelling method of transferring the complementary data and the cancelling process based on the complementary data transfer is executed in the data transfer cancellation processing unit (step (31)).

As mentioned above, even in the printer which executes the initializing operation for a long time by the reset signal, by minimizing the number of times of issuance of the reset signal, the next print job can be normally printed. According to steps (27) to (29), since step (31) is executed after confirming that the inconvenience due to the cancellation of the complementary data as mentioned in the first embodiment does not exist, the cancellation based on the complementary data can be efficiently realized.

Figure 7:
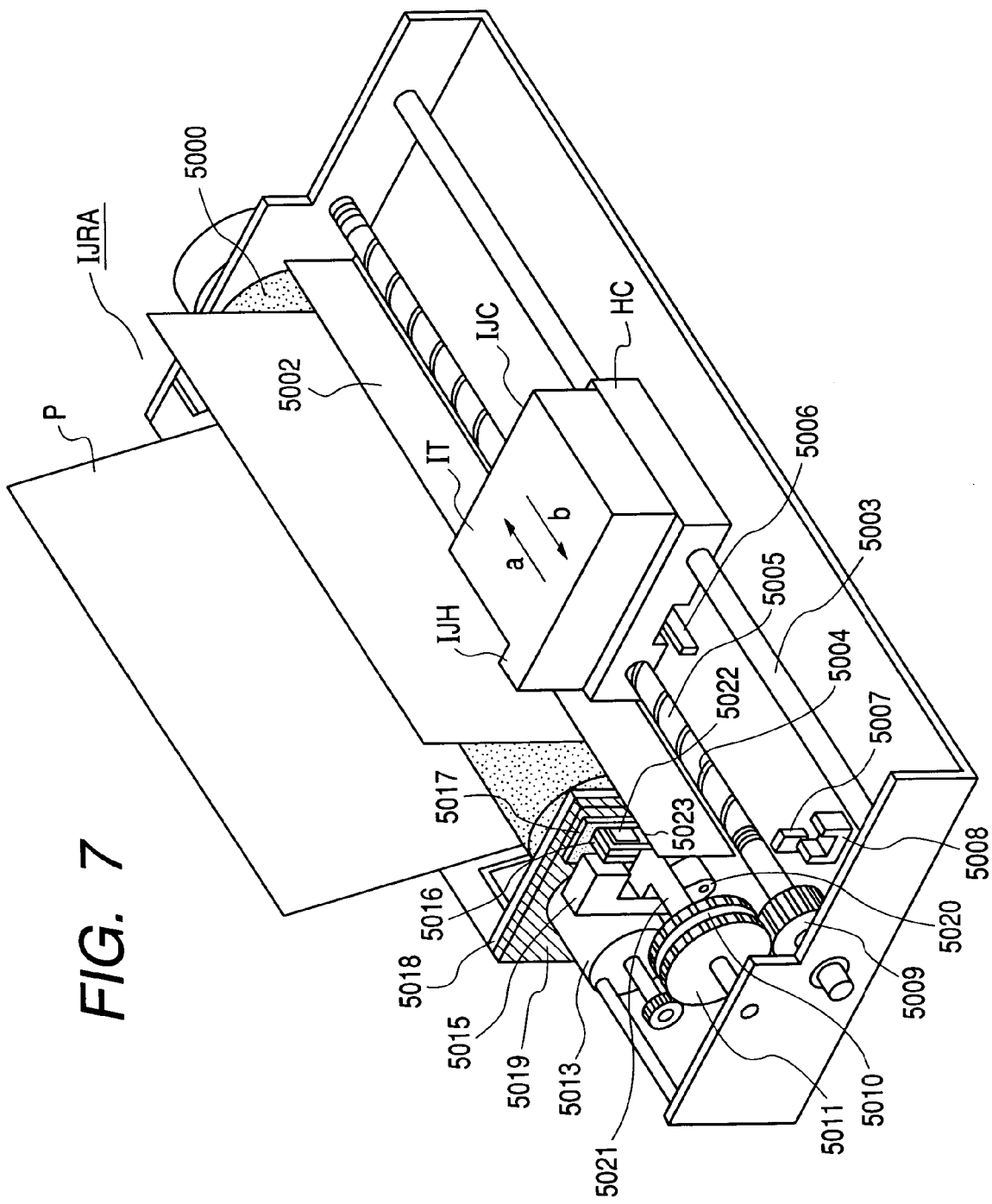
FIG. 7 is an external view showing a construction of the printer to which the invention can be applied.

FIG. 7 is an external view showing a construction of the printer to which the invention can be applied and shows a case of, for example, an ink jet recording apparatus (IJRA).

In the diagram, reference numeral 5013 denotes a drive motor. A lead screw 5005 is rotated in an interlocking relational manner with the forward/reverse rotation of the drive motor 5013 via driving force transfer gears 5009, 5010, and 5011. A carriage HC which is come into engagement with a spiral groove 5004 of the lead screw 5005 has a pin (not shown) and reciprocated in the directions shown by arrows a and b in the diagram via a guide rail 5003. An ink jet cartridge IJC having an ink jet head IJH and an ink tank IT is mounted in the carriage HC.

Reference numeral 5002 denotes a paper pressing plate for pressing paper P onto a platen 5000 in the carriage moving direction. Reference numerals 5007 and 5008 denote photocouplers functioning as home position detecting means each for confirming the existence of a position of a lever 5006 of the carriage HC in its arranging area and executing the switching of the rotating direction of the drive motor 5013, or the like.

Reference numeral 5016 denotes a supporting member for supporting a cap member 5022 for capping the whole surface of the ink jet head IJH as a recording head. Reference numeral 5015 denotes a sucking unit which functions as sucking means for sucking the cap member 5022 and executes sucking recovery of the ink jet head IJH via an inner opening 5023 of the cap member 5022.

Reference numeral 5017 denotes a cleaning blade which is movable in the front/rear directions by a member 5019; 5018 a main body supporting plate for supporting the cleaning blade 5017 and the member 5019; and 5021 a lever for starting the suction of the sucking recovery. The lever 5021 is moved in association with the movement of a cam 5020 which is come into engagement with the carriage HC. A driving force from the drive motor 5013 is transferred by well-known transfer means such as a clutch switching device or the like.

The printer is constructed in a manner such that when the carriage HC reaches an area on the home position side, a desired process of the capping, cleaning, or sucking recovery can be executed in its corresponding position by an action of the lead screw 5005. However, it is sufficient that the printer is constructed so as to execute a desired operation at well-known timing.

Figure 8:
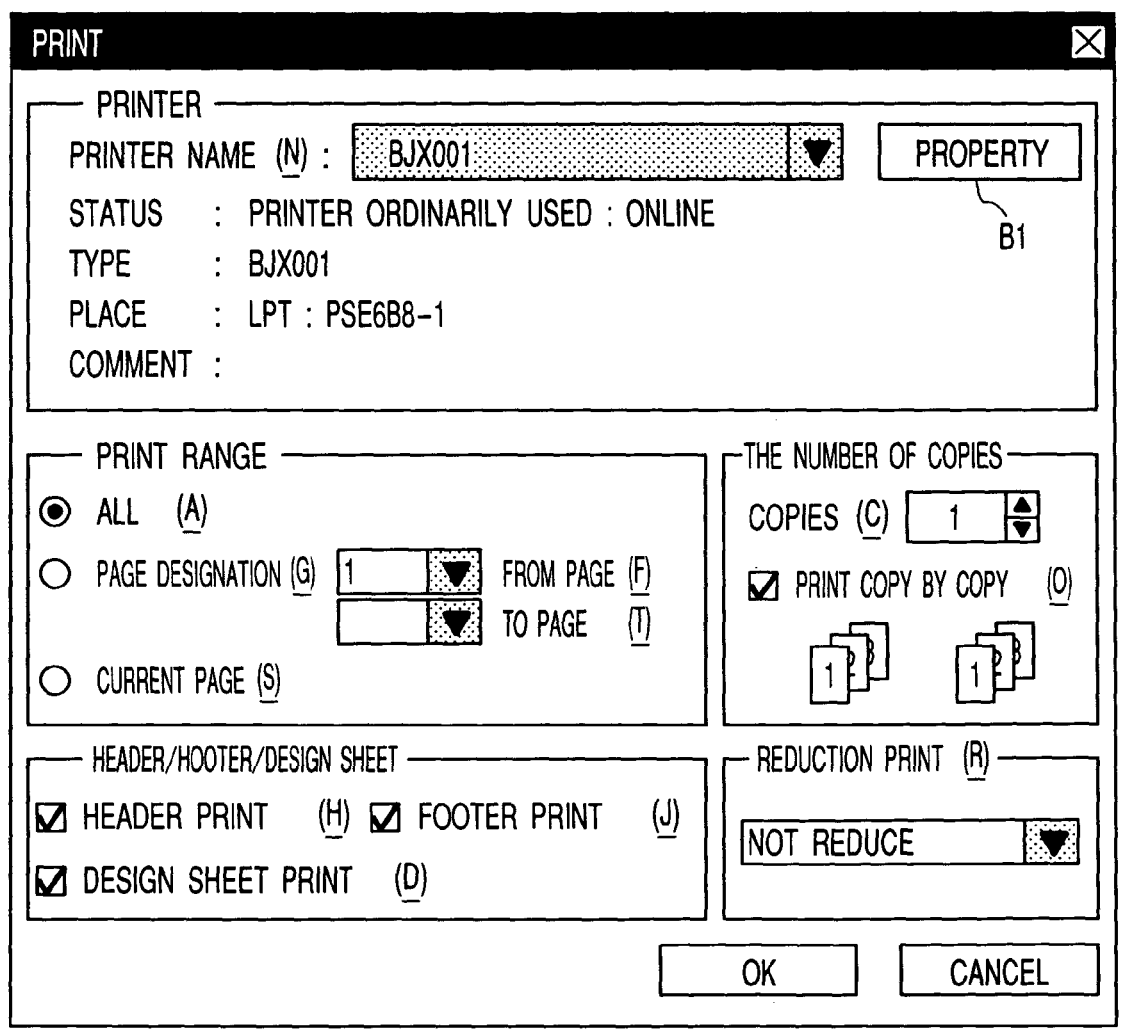
FIG. 8 is a diagram showing an example of a print setting display screen, which is displayed on a CRT of a host computer shown in FIG. 1.
Figure 9:
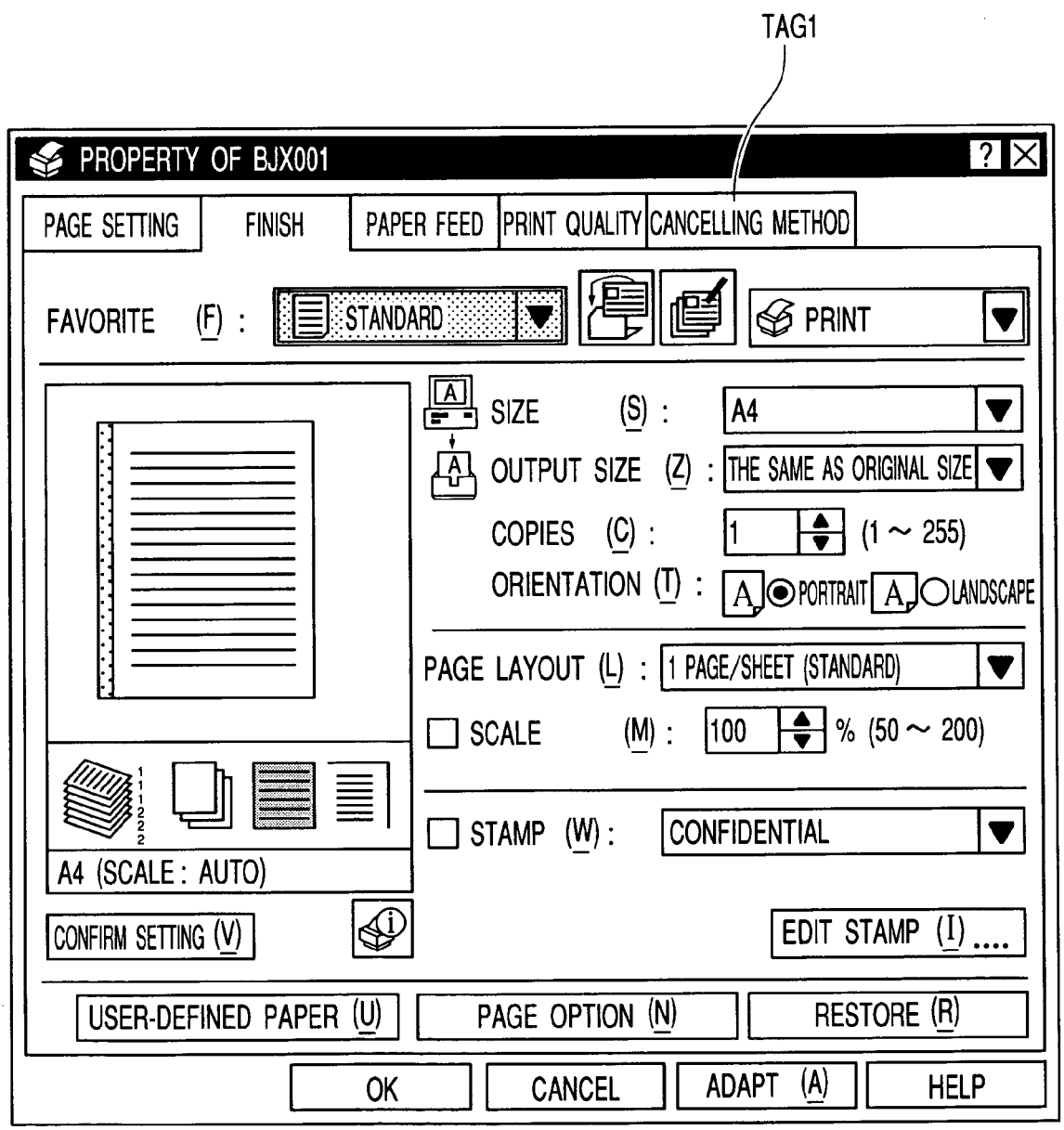
FIG. 9 is a diagram showing an example of the print setting display screen which is displayed on the CRT of the host computer shown in FIG. 1.

FIGS. 8 and 9 are diagrams each showing an example of a print setting display screen which is displayed onto the display unit 17 of the computer 1 shown in FIG. 1. A UI display program of the printer driver shown in FIG. 2 controls the display.

When the user instructs clicking of a property button B1 in the display on the display screen shown in FIG. 8, the display screen is switched to a detail setting display screen shown in FIG. 9. A tag TAG1 which can set the cancelling method in the embodiment is displayed on the display screen and he can select and instruct a default or automatic switching. By discriminating the set state, the data transmission control program executes the cancelling method switching process shown in FIGS. 4 to 6 mentioned above.

A construction of a data processing program which can be read out by the information processing apparatus according to the invention will be described hereinbelow with reference to a memory map shown in FIG. 10.

As described above, according to the first to third embodiments, the information processing apparatus which can determine the optimum cancelling method (resetting method) on the basis of each of the print environment (OS version), the printer information which is obtained from the apparatus information database, and the information of the type of interface or a combination of some of them among the various cancelling methods (resetting methods) existing mixedly is realized. Therefore, the cancellation of the job (resetting of the printer) can be executed by the optimum cancelling method among the cancelling methods which the printer can receive.

Since the printer driver which can cope with the printers of the various cancelling methods without forming the printer driver or the like corresponding to each cancelling method can be constructed, there is an advantage such that the developing costs can be reduced. For example, even if a new print environment (OS version) or a new type of interface is sold, it is sufficient to update the data transmission control program (including the functions and processes of the print environment discriminating unit, the interface discriminating unit, and the cancelling method switching unit in the embodiment).

FIG. 10 is a diagram for explaining a memory map of a memory medium to store various data processing programs which can be read out by the information processing apparatus according to the invention.

Although not shown particularly, there is also a case where information to manage a program group which is stored in the memory medium, for example, version information, an implementor, and the like are also stored and information which depends on the OS or the like on the program reading side, for example, icons or the like for identifying and displaying the programs are also stored.

Further, data depending on the various programs is also managed in the directory. There is also a case where a program to install the various programs into a computer and, if the installing program has been compressed, a program for decompressing it and the like are also stored.

The functions shown in FIGS. 4 to 6 in the embodiment can be also executed by a host computer in accordance with a program which is installed from the outside. In such a case, the invention is also applied to a case where an information group including the program is supplied to an output apparatus by a memory medium such as CD-ROM, flash memory, FD, or the like or from an external memory medium via a network.

Naturally, the object of the invention is accomplished by a method whereby the memory medium in which program codes of software for realizing the functions of the embodiments mentioned above have been recorded as mentioned above is supplied to a system or an apparatus and a computer (or a CPU or an MPU) of the system or the apparatus reads out the program codes stored in the memory medium and executes them.

In this case, the program codes themselves read out from the memory medium realize the novel functions of the invention and the memory medium in which the program codes have been stored constructs the invention.

As a memory medium for supplying the program codes, for example, a flexible disk, a hard disk, an optical disk, a magnetooptic disk, a CD-ROM, a CD-R, a magnetic tape, a nonvolatile memory card, a ROM, an EEPROM, or the like can be used.

Naturally, the invention incorporates not only a case where a computer executes the read-out program codes, so that the functions of the embodiments mentioned above are realized but also a case where an OS (Operating System) or the like which is operating on the computer executes a part or all of actual processes on the basis of instructions of the program codes and the functions of the embodiments mentioned above are realized by those processes.

Further, naturally, the invention incorporates a case where the program codes read out from the memory medium are written into a memory provided for a function expanding board inserted into a computer or a function expanding unit connected to a computer and, thereafter, a CPU or the like provided for the function expanding board or the function expanding unit executes a part or all of actual processes on the basis of the instructions of the program codes and the functions of the embodiments mentioned above are realized by those processes.

As described above, according to the invention, the optimum data cancelling method at a point of time can be dynamically switched from the information such as operating environment, interface, state of the interface, selection of the user, and the like.

What is claimed is:

1. An information processing apparatus for executing data transfer of a job formed on the basis of application data to a printer via interface means, comprising:
   discriminating means for discriminating a communication environment regarding the data transfer;
   cancelling method selecting means for selecting a cancelling method from a plurality of cancelling methods, that is optimum to the communication environment discriminated by said discriminating means on the basis of information obtained from an apparatus information database; and cancellation processing means for, when cancellation is instructed during the data transfer of the job, cancelling the job transferred by the said data transfer via said interface means by the cancelling method selected by said cancelling method selecting means,
   wherein said cancellation processing means has cancelling method switching means for switching the cancelling methods on the basis of a result of the selection by said cancelling method selecting means.

2. An apparatus according to claim 1, wherein said cancellation processing means shifts said printer to a state where the data transfer for a subsequent print job can be normally restarted.

3. An apparatus according to claim 1, wherein said discriminating means comprises:
   discriminating means for discriminating a type of said interface means by using said data transfer; print environment discriminating means for discriminating a print environment; and
   said cancelling method selecting means is further configured to select the cancelling method based on the discriminated type of said interface means and the discriminated print environment, and wherein said cancellation processing means executes a cancelling process on the basis of a result of the selection by said cancelling method selecting means.

4. An apparatus according to claim 1, wherein said discriminating means comprises:
   interface discriminating means for discriminating a type of said interface means which is used for said data transfer or a communicating state of said interface mean; and
   print environment discriminating means for discriminating a current set print environment,
   wherein the apparatus information database stores and manages printer information for the printer on a data transfer destination side, and wherein said cancellation processing means selects the cancelling method on the basis of at least one of the discriminated type of said interface means, the discriminated communicating state of said interface means, and the discriminated print environment.

5. An apparatus according to claim 1, further comprising user interface means for displaying the plurality of cancelling methods which can be switched and selecting and instructing one of the cancelling methods, and wherein said cancellation processing means cancels said data transfer by the selected and instructed cancelling method.

6. An apparatus according to claim 1, wherein said cancelling methods include a method of transmitting a reset signal of the interface means or a method of transferring complementary data.

7. An apparatus according to claim 1, wherein said apparatus information database stores and manages information showing whether said printer has a cancelling function based on a reset signal of the interface means or not, information showing whether an initializing operation is executed upon cancellation or not when said printer has the cancelling function, or information showing a time which is needed in the case of executing the initializing operation.

8. An apparatus according to claim 5, wherein said user interface means can display a list of the current valid cancelling methods to the user and receive a selecting instruction of the user.

9. A job processing method in an information processing apparatus having transmitting means for executing data transfer of a job formed on the basis of application data to a printer via interface means, comprising:
  a discriminating step of discriminating a communication environment regarding said data transfer;
  a cancelling method selecting step of selecting a cancelling method from a plurality of cancelling methods, that is optimum to the communication environment discriminated in said discriminating step on the basis of information obtained from an apparatus information database; and
  a cancellation processing step of, when cancellation is instructed during the data transfer of the job, cancelling the job transferred by the interface means by the cancelling method selected in said cancelling method selecting step,
  wherein said cancellation processing step has a cancelling method switching step for switching the cancelling methods on the basis of a result of the selection by said cancelling method selecting step.

10. A computer readable medium storing a computer program which is executed in an information processing apparatus having transmitting means for executing data transfer of a job formed on the basis of application data to a printer via interface means, comprising:
  a discriminating step of discriminating a communication environment regarding said data transfer;
  a cancelling method selecting step of selecting a cancelling method from a plurality of cancelling methods, that is optimum to the communication environment discriminated in said discriminating step on the basis of information obtained from an apparatus information database; and
  a cancellation processing step of, when cancellation is instructed during the data transfer of the job, cancelling the job transferred by the interface means by the cancelling method selected in said cancelling method selecting step,
  wherein said cancellation processing step has a cancelling method switching step for switching the cancelling methods on the basis of a result of the selection by said cancelling method selecting step.

* * * * *